Figure 1:
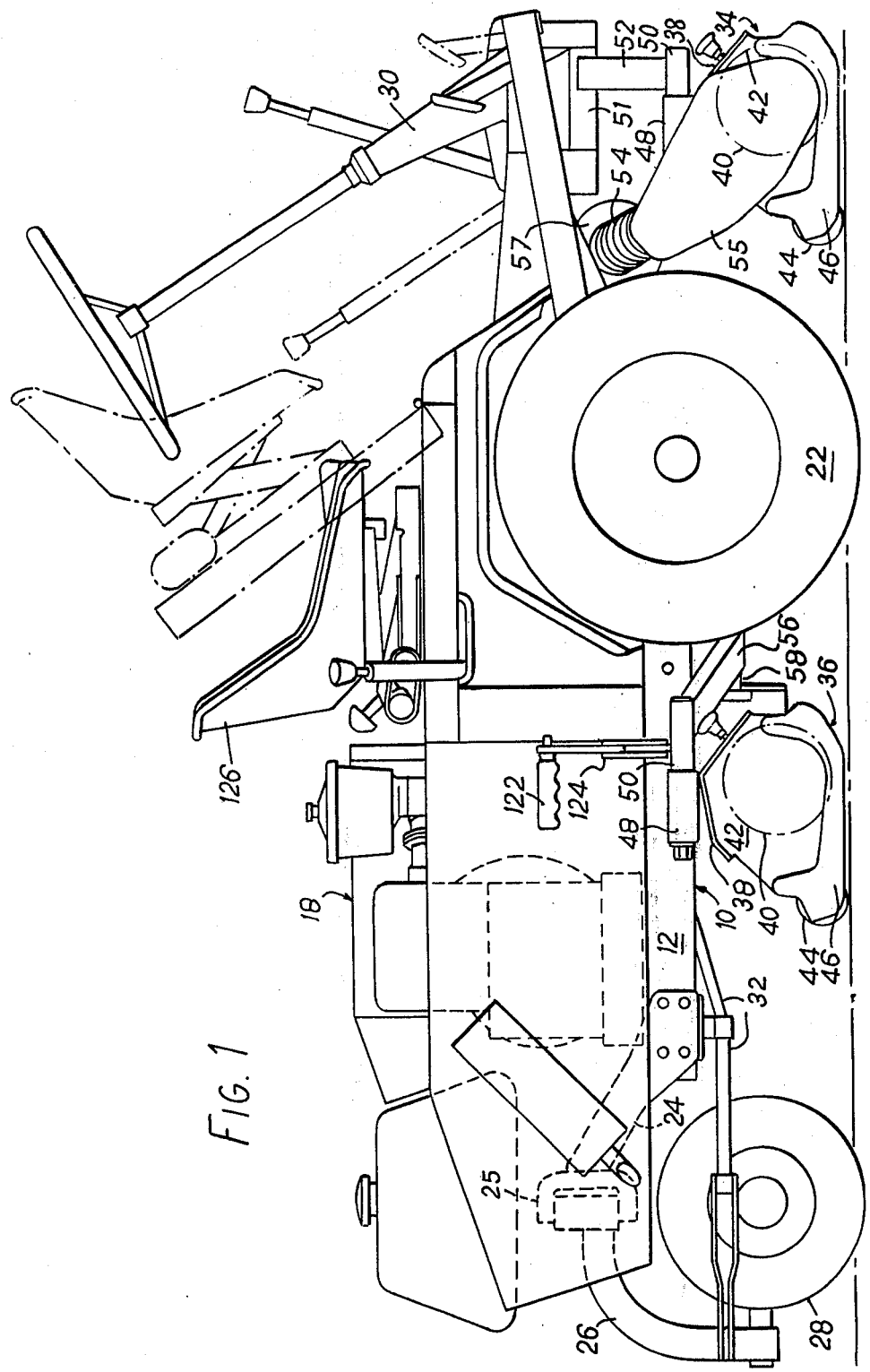

United States Patent [19]
Mitchell

[11] 3,968,630
[45] July 13, 1976

[54] MOWER MACHINES

[75] Inventor: Brian Eric Mitchell, Ipswich, England

[73] Assignee: Ransomes Sims & Jefferies Limited, Ipswich, England

[22] Filed: July 18, 1975

[21] Appl. No.: 597,373

[30] Foreign Application Priority Data
July 29, 1974   United Kingdom............... 33419/74

[52] U.S. Cl. ..................................................... 56/7
[51] Int. Cl.² ......................................... A01D 75/30
[58] Field of Search .......................... 56/7, 249–254, 56/294

[56] References Cited
UNITED STATES PATENTS

| 2,325,252 | 7/1943 | Krenzke | 56/7 |
| 2,677,224 | 5/1954 | Stegeman | 56/7 |
| 2,909,882 | 10/1959 | Lewis | 56/7 |
| 3,731,469 | 5/1973 | Akgulian et al. | 56/7 |
| 3,742,685 | 7/1973 | Lian et al | 56/7 |

Primary Examiner—Russell R. Kinsey
Attorney, Agent, or Firm—Browdy and Neimark

[57] ABSTRACT

A self-propelled grass mower machine has a laterally projecting helically bladed cutter, a driving motor for effecting propulsion of the machine and driving of the cutter reel and transmission means for driving the cutter reel from the motor, the transmission means including a driven member, a transversely disposed driven shaft and universal couplings connecting respective opposite ends of the driven shaft to the reel and, adjacent the side of the machine remote from the reel to said driven member of the transmission means, the axes of the shaft and the reel being mutually inclined at a large obtuse angle.

8 Claims, 5 Drawing Figures

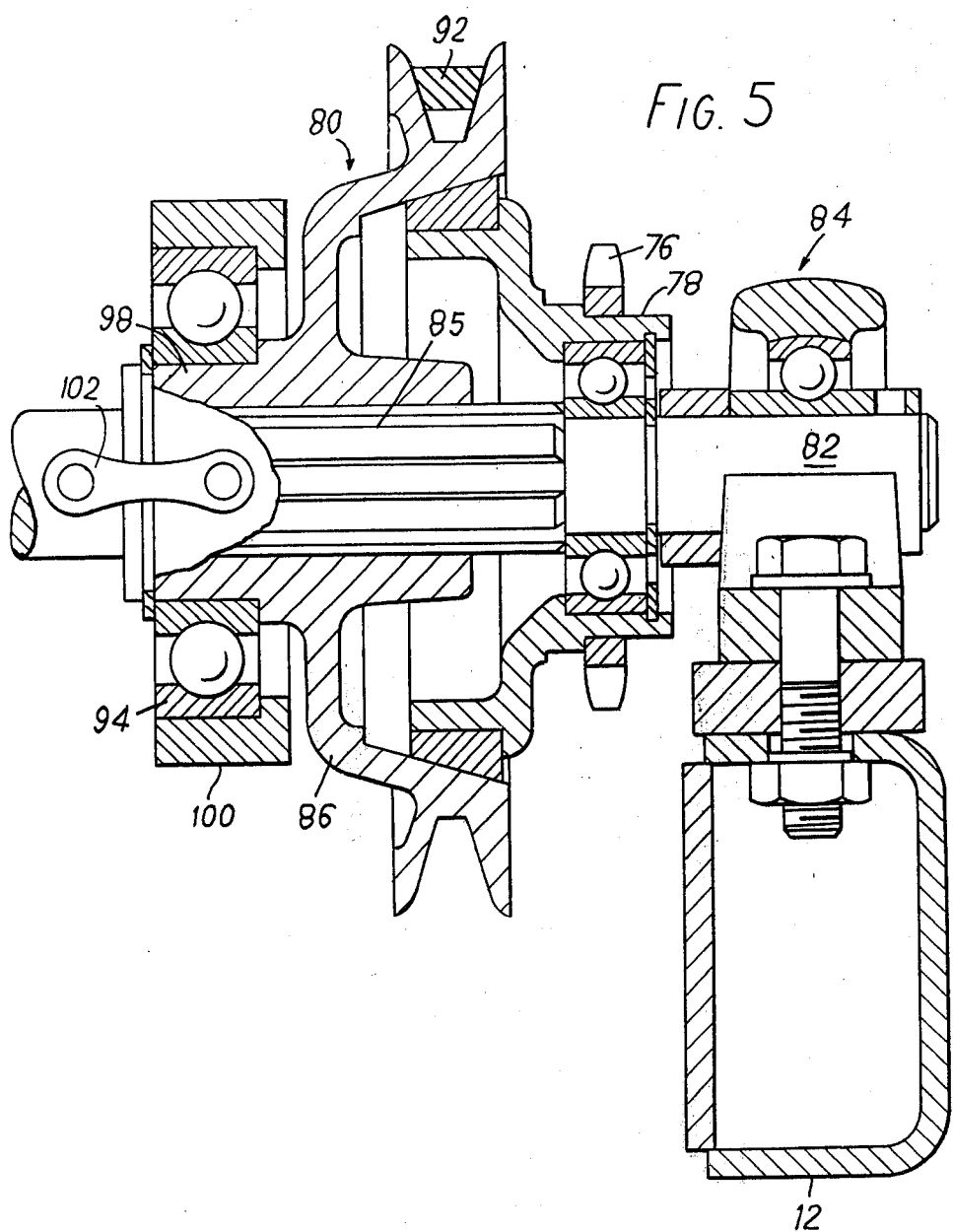

MOWER MACHINES

This invention relates to grass mower machines.

In grass mower machines where a plurality of cutter reels are used it is necessary, in the case of a three reel machine, for the wing units to cut a swath which overlaps that cut by the central unit. This means that if the central unit is not to be of undesirably large axial length, the wing units have to be mounted at their inner ends close to the sides of the machine chassis. As each cutter reel in operation has to be free to move in a vertical plane containing its axis this makes desirable the use of universal couplings on a transmission member driving the reel. When driving a wing cutter reel from a driven member at the same side of the chassis as the reel the difficulty arises because of the vertical movement which the reel has to be free to perform and because of the need to mount the reel near to the chassis of orientating the universal coupling driving the driven member in the requisite position in which it will operate satisfactorily.

It is an object of this invention to provide an improved grass mowing machine in which the problem referred to is overcome.

According to the present invention there is provided a self-propelled grass mower machine comprising a chassis, ground-engaging wheels on which the chassis is supported, a cutter reel of the helically bladed type mounted on and, when in operative cutting position, extending laterally of and projecting from the chassis, a driving motor carried on the chassis for effecting propulsion of the machine and driving of the cutter reel, and transmission means for driving the cutter reel from the motor, wherein said transmission means include a driven member, a transversely disposed driven shaft and universal couplings connecting respective opposite ends of the driven shaft to the reel and, adjacent the side of the chassis remote from the reel, to said driven member of the transmission means, the axes of the shaft and the reel being mutually inclined at a large obtuse angle therebetween.

Preferably the transmission means include clutch means and the cutter reel is mounted on the chassis by means enabling said reel to be moved with respect to the chassis from said operative cutting position to an inoperative raised position, means being provided which disengage and re-engage automatically the clutch means as the cutter reel is respectively raised from and lowered to its cutting position.

Where two cutter reels are provided one each side of the chassis, the reels may have associated therewith respective clutches provided each with an output driven member that is coupled by a flexible endless drive band, e.g. a chain or belt, to one of said driven shafts of the transmission means, the input members of the two clutches being driven from a lay shaft transversely of the machine.

The means mounting the or each cutter reel movably with respect to the chassis may comprise a reel-carrying arm mounted pivotally on the chassis, and the clutch may be operable by a mechanism including a cam follower engagable by a cam that is angularly movable as said arm pivots.

Suitably, the or each driven shaft of the transmission means may be an extensible, telescopic shaft.

Figure 2:
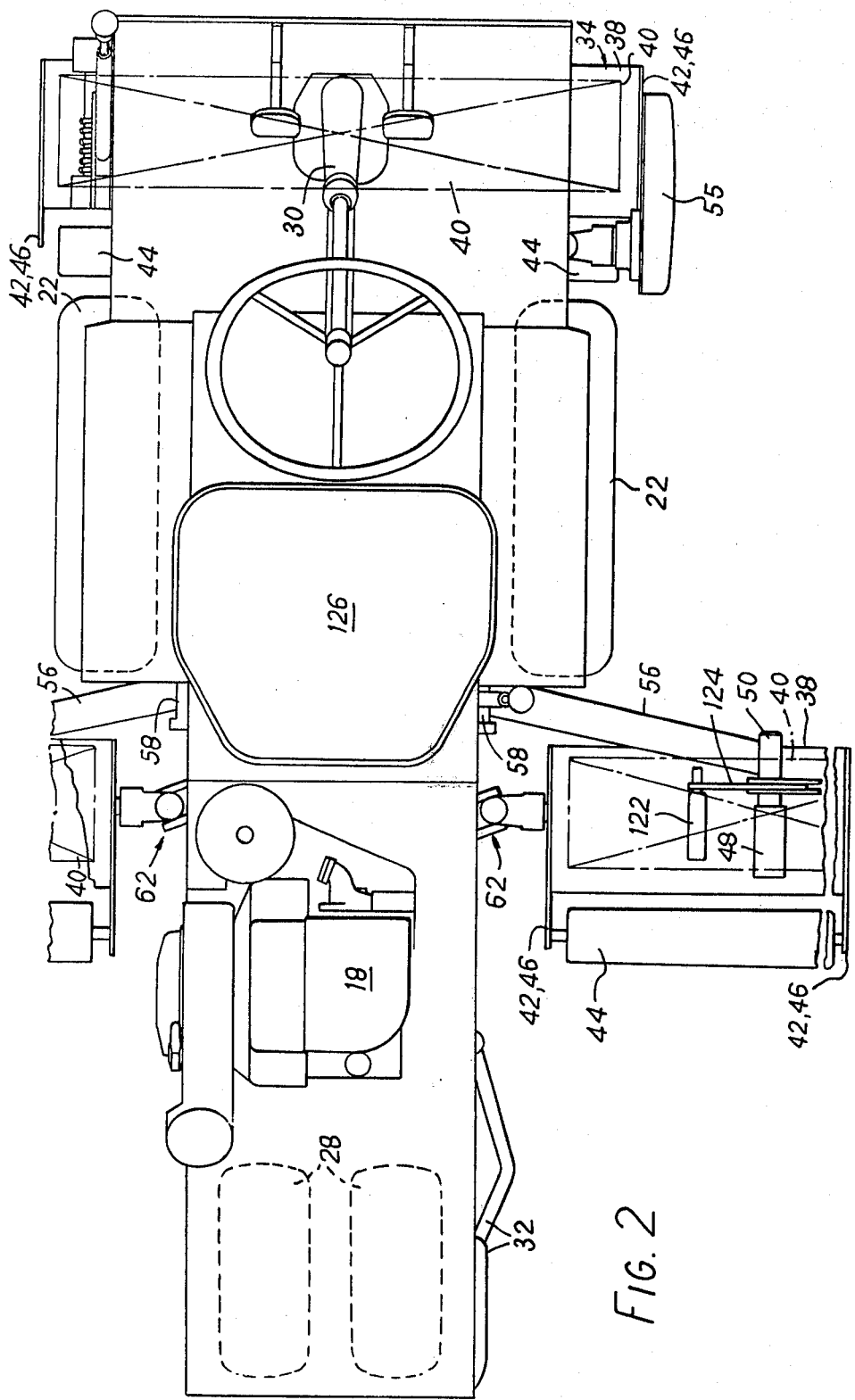
Figure 3:
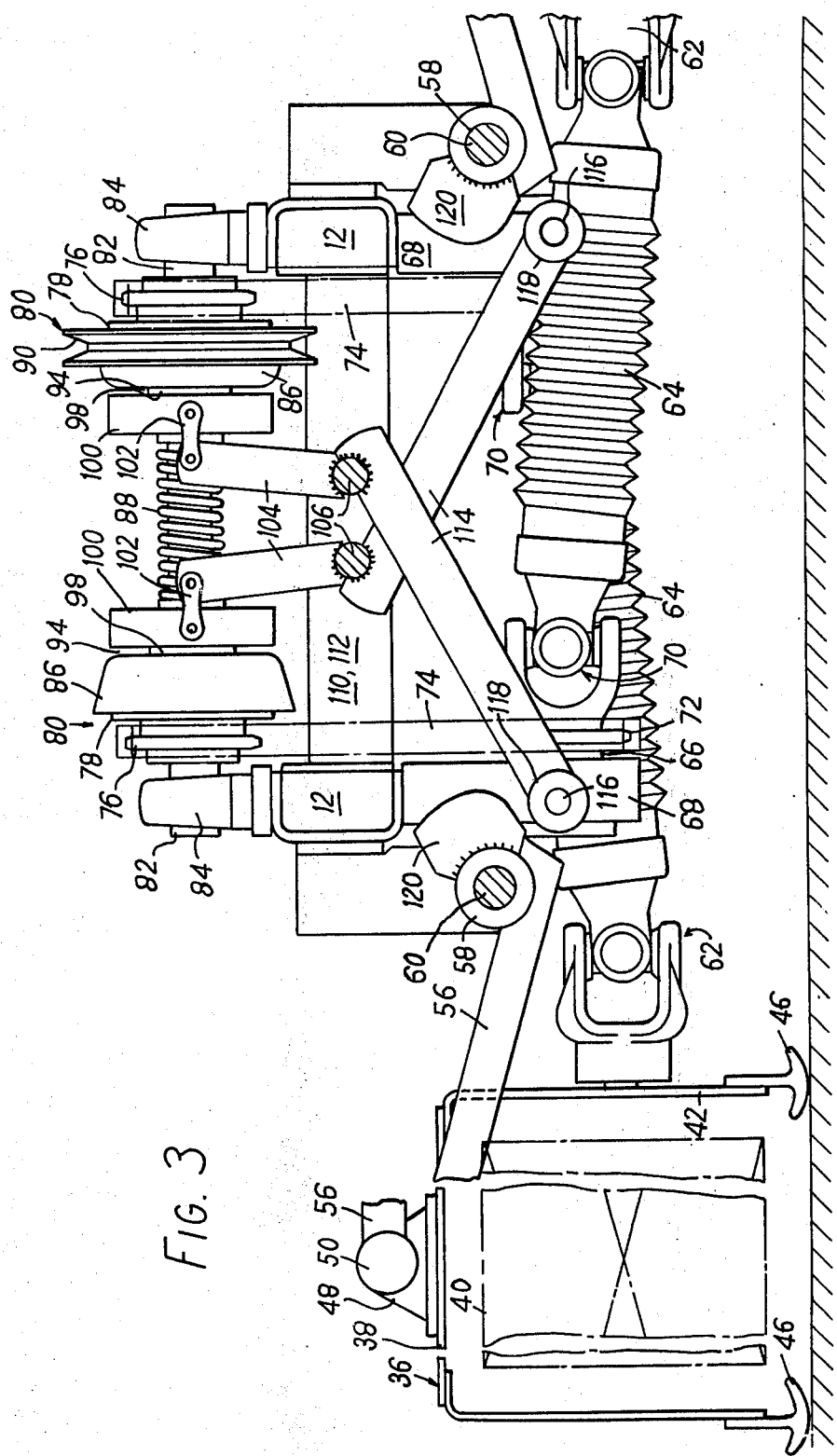
Figure 4:
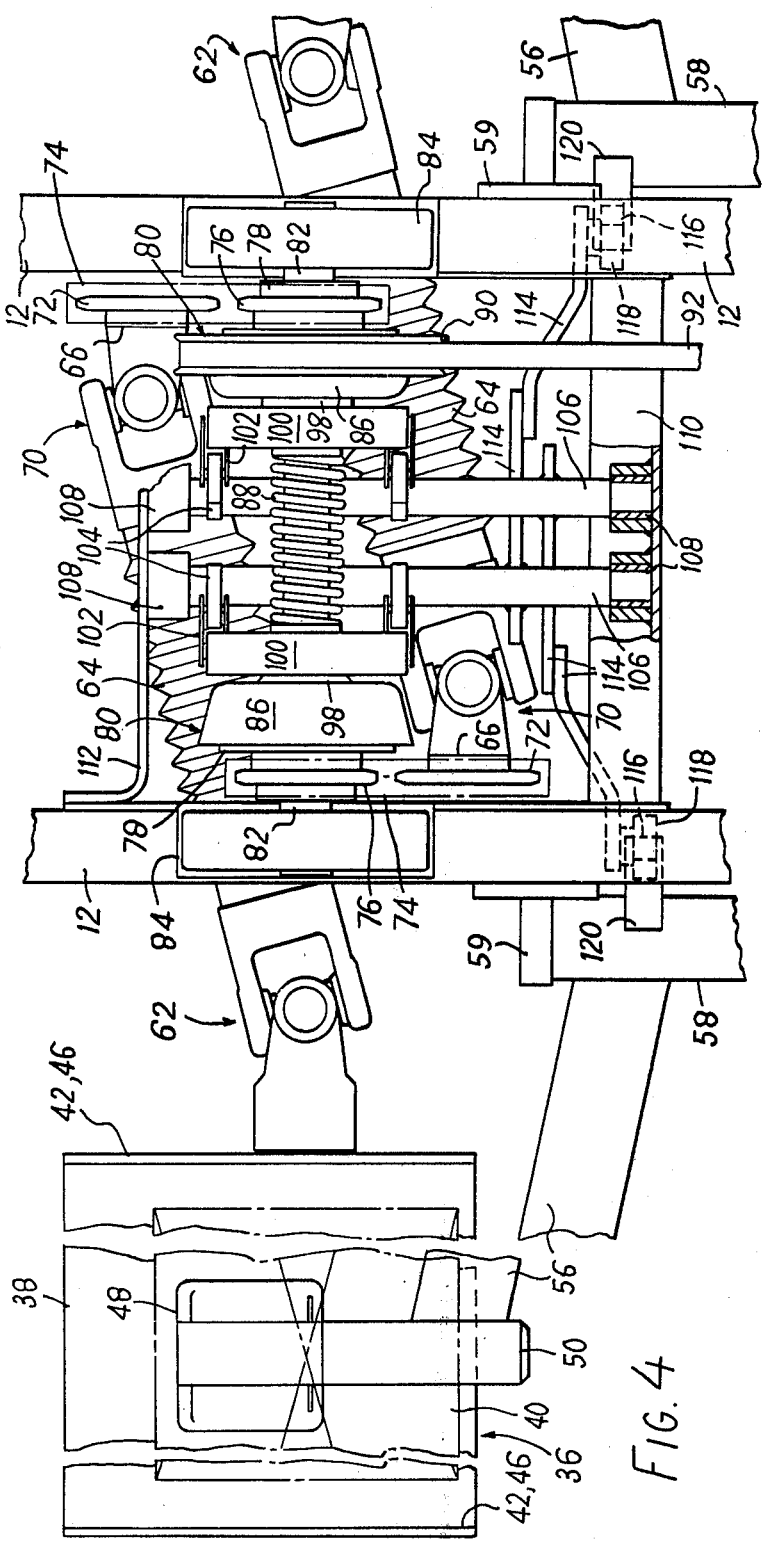

The invention will now be described, by way of example, with reference to the accompanying drawings, in which:

FIG. 1 is a side view of a self-propelled grass mower machine according to the invention, FIG. 2 is a plan view of the machine of FIG. 1, FIG. 3 is a cross-sectional view taken along the line III—III approximately of FIG. 2 with certain parts of the machine omitted, FIG. 4 is a plan view of FIG. 3, and FIG. 5 is a scrap sectional view showing a detail of the structure.

Referring to the drawings, a self-propelled grass mower machine comprises a chassis 10 having side members 12. An internal combustion engine 18 constituting the drive motor for the machine is mounted on the chassis and is coupled by conventional transmission means (not shown) to drive forward, ground engaging propulsion wheels 22. A rearwardly and upwardly extending limb 24 of the chassis 10 provides a pivotal support 25 for a yoke 26 on which is mounted a pair of close-coupled steering wheels 28. The yoke 26 is connected to the steering mechanism 30 of the machine by way of a steering linkage 32.

The mower machine carries a central cutting unit 34 in front of the propulsion wheels 22, and two lateral cutting units 36 at respective opposite sides of the chassis rearwardly of the propulsion wheels 22. Each of the three cutting units comprises a housing 38 of generally inverted U-shaped cross-section with a cutter reel 40 of the helically bladed type rotatably mounted between depending sides 42 of the housing. A roller 44 is mounted between a pair of skids 46 that are each adjustably secured to the sides 42. The housing 38 is provided centrally on the top thereof with a bearing block 48 through which a short rod 50 extends normal to the reel 40. The rod 50 of the front cutting unit 34 is suspended from a forward part 51 of the chassis 10 by transversely extending support arm 52 which is rotatably mounted on the part 51 of the chassis to allow the housing 38 to be raised and lowered. The cutter reel 40 of the front cutting unit 34 is driven from the vehicle gearbox (not shown) via a transmission including a transversely disposed, gaitered telescopic drive shaft 54 coupled by universal couplings at respective opposite ends thereof to a chain drive 55 at one end of the cutter reel and a drive member 57 of the transmission. The arm 52 from which the front cutting unit 34 is suspended is biassed upwardly by a spring (not shown) which relieves most of the weight of the front cutting unit 34 from off the ground so that, in operation, the front cutting unit can float over irregularities in the ground.

The rod 50 of each of the side cutting units 36 is secured to a support arm 56 extending laterally of the machine. Each cutting unit support arm 56 is secured to a sleeve 58 at its end remote from the cutting unit, and this sleeve 58 is rotatably mounted on a pivot rod 60 fixed by a bracket 59 alongside the chassis side member 12. Each support arm 56 is spring biassed upwards by a coil spring (not shown) on the sleeve 58, the ends of the spring engaging the support arm 56 and the bracket securing rod 60 to the chassis. This spring biassing is such as to take most of the weight of each cutting unit 36 off the ground so that, in operation, the side cutting units can float over irregularities in the ground.

The drive to the cutter reel 40 of each cutting unit 36 is taken from an output of the engine transmission via a drive comprising a universal coupling 62 connecting the inside end of the cutter reel to one end of a gaitered telescopic drive shaft 64 extending transversely across the machine to a stub shaft 66, rotatably supported in a bracket 68 depending from the chassis side member 12, adjacent the other cutting unit 36. The end of shaft 64 is coupled to stub shaft 66 by another universal coupling 70. Each of the two stub shafts 66 is provided with a sprocket wheel 72 that is coupled by an upwardly extending chain 74 to another sprocket wheel 76 on the driven member 78 of a clutch 80. The two clutches 80 are mounted on a common lay shaft 82 supported in bearings 84 mounted on and extending upwardly from the chassis side members 12, the driven member 78 of each clutch 80 being freely rotatable about the lay shaft 82 whilst the drive member 86 of each clutch 80 is spline connected to the lay shaft 82, as indicated at 85, and spring biassed into engagement with its associated driven member 78 by a common spring 88 encompassing the lay shaft 82 between the two clutches 80 and acting in opposite directions against the two drive members 86. The drive member 86 of the clutch on the left hand side of the machine (the right hand side of FIGS. 3 and 4) is provided with a pulley wheel 90 coupled by a belt 92 to the output from the gearbox (not shown) that is employed to drive the lateral cutting units 36. Thus it will be apparent that the drive transmission for driving the cutter reel 40 of each lateral cutting unit 36 from the engine 18 that effects propulsion of the machine comprises the gearbox (not shown), belt 92, pulley wheel 90, lay shaft 82, one of the two clutches 80, sprocket wheel 76 on the driven member 78 of that clutch, associated chain 74 and sprocket wheel 72 and the corresponding transversely disposed drive shaft 64 to the relevant cutter reel 40.

It will be apparent from FIG. 4 that the axes of the cutter reels 40 of the two lateral cutting units 36 are co-linear and lie in a common vertical plane containing the axis of the lay shaft 82. To enable both drive shafts 64 to extend transversely across the machines, they are disposed, as seen in plan view, parallel to one another and spaced apart in the longitudinal direction of the machine, one of them being directed rearwardly from forwardly disposed stub shaft 66 carried by one of the chassis side members and the other being directed forwardly from rearwardly disposed stub shaft 66 carried by the other chassis side member 12.

It will be seen from FIGS. 3 and 4 that the angle between the axes of the drive shaft 64 and its associated cutter reel 40 is a large obtuse angle and is close to 180°, the angle in the vertical plane being of the order of 175° and the angle in the horizontal plane being of the order of 165°. The drive through each of the universal couplings is accordingly transmitted efficiently.

Since the drive to the cutter reels 40 of the three cutting units is taken from the gearbox that also drives the front propulsion wheels 22, the rotary speed of each cutter reel is in operation always in a predetermined ratio to the driven speed of the wheels 22.

The drive member 86 of each of the two clutches 80 is provided with an inward extension 98 on which is mounted the inner race of a bearing 94 of which the outer race is secured in a sleeve 100. Each sleeve 100 with its flange 98 serves by axial movement thereof to operate its associated clutch 80. Each of the sleeves 100 has a pair of links 102 pivotally connected at one end to diametrically opposite locations of the sleeve with the opposite ends of the links 102 pivotally connected to the ends of a pair of links 104. The opposite ends of the links 104 of each pair are welded, remote from the links 102, to a shaft 106 extending longitudinally of the machine and supported in end bearings 108 mounted on forward and rearward chassis cross members 110 and 112. Each shaft 106 has a limb 114 welded thereto which extends across the machine to a location adjacent the pivotal end of the support arm 56 carrying the lateral cutting unit 36 whose cutter reel 40 is driven through the clutch 80 associated with the particular limb 114. The end of each limb 114 remote from its associated shaft 106 has a short stud 116 projecting therefrom in a direction longitudinally of the machine. Each stud 116 has a roller 118 rotatably mounted thereon. A cam 120 is welded to each sleeve 58 that is fast with a support arm 56 carrying a lateral cutting unit 36, so that when a lateral cutting unit 36 is raised from the lowered operative position shown in FIG. 3, the cam 120 rotates about the axis of the pivot rod 60, and engages and depresses the roller 118 adjacent thereto which acts as a cam follower. Depression of a roller 118, causes the limb 114 supporting that roller to rotate the shaft 106 fast therewith and thereby rotate the link 104 fast with that shaft to pull the links 102 and the sleeve 100 attached to the latter against the bias of spring 88 so as to disengage the clutch 80 through which drive is transmitted to the cutter reel of the cutting unit being raised. Each of the lateral cutting units 36 may be raised manually by means of a handle 122 (see FIGS. 1 and 2) connected by brackets 124 to the rod 50 of each lateral cutting unit 36. The handles 122 are positioned so that they may be readily grasped by the driver of the machine from his seat 126 and when a handle 122 is pulled to raise a lateral cutting unit 36, the clutch 80 through which the rotary drive to the cutter reel 40 of that cutting unit is transmitted, is automatically disengaged and is automatically re-engaged on subsequent lowering of that cutting unit 36 to its operative position shown in FIGS. 3 and 4.

It will be appreciated that the support arms 56 may be raised and lowered alternatively by hydraulic piston-cylinder arrangements. If such arrangements are provided, automatic disengagement and re-engagement of the clutches 80 may be effected by the cam and follower mechanism described above or by an hydraulic clutch-operating device.

The front cutting unit 34 disposed centrally of the machine may also be raised and lowered by a mechanism corresponding to that described above in connection with each of the lateral cutting units 36, or by a cable-and-pulley system. A cable-and-pulley arrangement could alternatively be used to the cam mechanism described as the raising and lowering mechanism for the side cutting units.

The drive to the cutter reels of all three cutting units 34, 36 may be disconnected, even when the units are in their lowered operational position, by disengaging a dog clutch (not shown) on the output shaft of the gearbox or by disengaging the principal clutch of the machine that is connected between the engine 18 and the input to the gearbox.

In the accompanying drawings, the lateral cutting units 36 are shown disposed rearwardly of the front ground engaging wheels 22 with the central cutting unit 34 extending forwardly of these wheels. However the relative dispositions can be reversed, that is to say the lateral units could be provided forwardly of the central unit, all the three units being behind or in front of the ground engaging wheels 22, or only the lateral units being forwardly of the wheels 22 and the central unit being rearwardly of those wheels.

I claim:

1. A self-propelled grass mower machine comprising a chassis, ground-engaging wheels on which the chassis is supported, a cutter reel of the helically bladed type mounted on and, when in operative cutting position, extending laterally of and projecting from the chassis, a driving motor carried on the chassis for effecting propulsion of the machine and driving of the cutter reel, and transmission means for driving the cutter reel from the motor, wherein said transmission means include a driven member, a transversely disposed driven shaft and universal couplings connecting respective opposite ends of the driven shaft to the reel and, adjacent the side of the chassis remote from the reel, to said driven member of the transmission means, the axes of the shaft and the reel being mutually inclined at a large obtuse angle therebetween.

2. A mower machine as claimed in claim 1, wherein the transmission means include clutch means and the cutter reel is mounted on the chassis by means enabling said reel to be moved with respect to the chassis from said operative cutting position to an inoperative raised position, means being provided which disengage and re-engage automatically the clutch means as the cutter reel is respectively raised from and lowered to its cutting position.

3. A mower machine as claimed in claim 1, wherein at each side of the machine a cutter reel, in its operative cutting position, extends laterally of and projects from the chassis and first and second transmission means for driving the respective cutting reels each include a driven member, a transversely disposed driven shaft and universal couplings connecting respective opposite ends of the driven shaft to the said reel and, at the side of the chassis remote from the reel, to said driven member the axes of the shaft and the reel being mutually inclined at a large obtuse angle.

4. A mower machine as claimed in claim 3, wherein a clutch is provided in the transmission means of each reel and first and second means are provided for the respective clutches which each disengage and re-engage the corresponding clutch as the associated cutting reel is raised from and lowered to its cutting position.

5. A mower machine as claimed in claim 4 wherein an arm is provided for each cutter reel on one end of which the reel is pivotally mounted whilst at its other end the arm is pivotally supported on the machine chassis and carries a member which on raising and lowering of the cutting reel actuates the means for disengaging and re-engaging the corresponding clutch of the transmission means connected to the reel.

6. A mower machine as claimed in claim 5, wherein the member on each arm is a cam which on raising and lowering of the corresponding reel engages a cam follower of the means for disengaging and re-engaging the clutch of the corresponding transmission means of the reel.

7. A mower machine as claimed in claim 4, wherein the clutches of the first and second transmission means are mounted on a common lay shaft.

8. A mower machine as claimed in claim 3, wherein the transversely disposed driven shafts of the first and second transmission means are parallel.

* * * * *